United States Patent [19]
Pines et al.

[11] Patent Number: 5,602,391
[45] Date of Patent: Feb. 11, 1997

[54] QUINCUNX SAMPLING GRID FOR STARING ARRAY

[75] Inventors: Michael Y. Pines, Los Angeles; Robert L. Sendall, Chatsworth, both of Calif.

[73] Assignee: Hughes Electronics, Los Angeles, Calif.

[21] Appl. No.: 393,603

[22] Filed: Feb. 23, 1995

[51] Int. Cl.⁶ .................................. G01J 5/06; H04N 5/33
[52] U.S. Cl. .................. 250/332; 250/370.08; 250/208.1
[58] Field of Search .............................. 250/332, 370.08, 250/208.1, 334, 338.3, 338.4

[56] References Cited

U.S. PATENT DOCUMENTS

| | | | |
|---|---|---|---|
| 4,602,289 | 7/1986 | Sekine | 250/208.1 X |
| 4,728,804 | 3/1988 | Norsworthy | 250/578 |
| 4,767,937 | 8/1988 | Norsworthy | 250/578 |
| 4,910,401 | 3/1990 | Woods | 250/332 |
| 4,942,301 | 7/1990 | Voles | 250/332 X |

*Primary Examiner*—Carolyn E. Fields
*Assistant Examiner*—Edward J. Glick
*Attorney, Agent, or Firm*—Michael W. Sales; Wanda K. Denson-Low

[57] ABSTRACT

An imaging device (10) includes an array (18) of picture elements (16) or pixels, each of which is responsive to incident radiant energy to provide an output signal. The array (18) consists of pixels (16) in adjacent horizontal rows, each row having a certain pitch (P) or center-to-center distance between pixels. Each alternate row is horizontally offset by a distance equal to one-half of a row pitch from each adjacent row to form a "brick wall" or quincunx pattern. An azimuthal traverse of the quincunx focal plane array (18) provides twice the azimuthal resolution and approximately 140 percent of the minimum resolvable temperature measurement capability of conventional focal plane arrays.

18 Claims, 2 Drawing Sheets

QUINCUNX SAMPLING GRID FOR STARING ARRAY

BACKGROUND OF THE INVENTION

1. Field of the Invention

The present invention relates to focal plane array imaging devices. More particularly, the present invention relates to architecture and methods for employing a focal plane array for thermal imaging in a staring system.

2. Related Technology

Imaging devices in the form of focal plane array (FPA) configurations are well known in the art. These conventional FPA's traditionally consist of light-responsive sensors called picture elements ("pixels") arranged linearly or in an orthogonal, usually rectangular pattern of rectilinear rows and columns of photo-responsive detectors on the face of a semiconductor substrate. Hereinafter, terms such as "light" "radiant energy", and the like mean electromagnetic radiation including, but not limited to, visible light, invisible infrared or ultraviolet radiation, and other radiation.

Each pixel location may possess photocell circuitry designed to provide at least one electrical output signal that is directly related to the intensity of electromagnetic energy (visible light or infrared light, for example) impinging on that pixel location from a source object to be imaged. When these pixels are interrogated or sampled, usually in sequence within a respective row or column, the individual electrical output signals are accessed and supplied to external electrical processing circuitry. The electrical output signals may be digitized to provide a stream of data words carrying information relating to the intensity of incident energy at each pixel. The information may then be summarized or integrated to form an image representing the source object. This image may be presented, for example, on a display device such as a CRT (cathode ray tube), or LCD (liquid crystal display).

In a scanning imaging system (i.e., one wherein the source object or objects are not continuously viewed), the sampling frequency for the pixels may be varied by controlling the timing of the scanning or readout of the focal plane array. In contrast with staring systems, a scanning system uses a linear array of pixels across which successive image portions are swept by a moving scanning mirror. The sampling frequency of such a scanning system may be varied at the input to the array merely by changing the timing of the scan of the object to be imaged. The discussion herein will be confined to staring systems, which require no such mechanical scanning device.

In order to test the resolution of conventional focal plane arrays, a four bar arrangement of parallel bars each having a one-by-seven aspect ratio is employed as a standard test pattern. These bars have a definite temperature difference from the background scene. When the bar pattern is oriented vertically, a sampling of the pixels in a column-by-column interrogation (i.e., repeatably sampling of successive pixels in a column, and then successive pixels in a next adjacent column) provides resolution data in the horizontal or azimuthal direction of the test source. Similarly, vertical resolution is tested by use of a row-by-row sampling of horizontally oriented bars. Discussion herein will be limited to the measurement of azimuthal resolution.

For thermal imaging systems, a significant measure of detector performance is the MRT, or minimum resolvable temperature difference of the object in comparison to the background scene. This test is a measure of the signal energy at the detector surface of the pixels of a FPA. Up to a theoretical limit, known as the Nyquist limit (to be discussed below), the MRT for a given FPA may be plotted against the frequency of sampling of the pixels in the FPA to provide a graphical presentation of system performance. It will be recognized that the light flux integration period for particular pixels of an array varies as the reciprocal of sampling frequency. That is, as sampling frequency increases, the light flux integration interval for the pixels decreases. Thus, a frequency is reached at which the pixels cannot resolve a particular difference in temperature between the bar pattern and the background scene.

The frequency of pixel sampling may be expressed as the number of sampling incidents occurring for a particular arc subtended by the source object, e.g., in cycles per milliradian. It is desirable to be able to measure the MRT difference of an array at the higher spatial frequencies where the detector resolution is high. Unfortunately, for all spatial frequencies above the theoretical Nyquist limit, MRT difference measurements are not able to be measured following current industry standards for conventional detector arrays, either staring or scanning.

In communication theory, the maximum time between regularly spaced instantaneous samples of a signal of bandwidth W for complete determination of the signal wave form is known as the Nyquist interval. This maximum time interval is derived to be ½W seconds. The reciprocal of the Nyquist interval, expressed as a frequency, is the Nyquist limit.

Heretofore, practitioners of the relevant technology have relied on a published and widely accepted model for relating the Nyquist limit to MRT difference measurement. According to that model, known as FLIR 92, MRT becomes indefinitely large at the Nyquist limit, so that attempts to measure performance at any higher spatial frequency are futile. That the Nyquist figure represents the operational frequency limit to meaningful MRT difference measurement is confirmed in the following pronouncement excerpted from the FLIR 92 document itself, as published by the U.S. Army Night Vision and Electro-Optics Directorate, Visionics/Modeling Division.

> MRT difference is defined for a periodic target ( four 7:1 aspect ratio bars), and the criterion for "calling" MRT difference at some frequency is that the four bars must be fully resolved by the observer. In thermal images, the four bars of the MRT difference target will never be fully reconstructed to the observer at frequencies beyond a system's Nyquist limit, and therefore, the criterion for calling MRT difference cannot be met. FLIR 92 adheres strictly to this definition by not predicting MRT differences at frequencies beyond the Nyquist limit.

As the most current version of an earlier (FLIR 90) model, FLIR 92 thus presents, as the imaging industry standard doctrine, that ". . . because the ability of observers to interpret information for target discrimination at Super Nyquist frequencies (i.e., above the Nyquist limit) has not been quantified, attempting to extrapolate without robust data is unacceptable".

SUMMARY OF THE INVENTION

In view of the deficiencies of the conventional technology, a primary object of this invention is to avoid one or more of these deficiencies.

Accordingly, it is an object of the present invention to provide an imaging system that overcomes the limitations imposed by conventional imaging systems as expressed in the imaging industry's standard model of performance.

It is another object of this invention to provide a focal plane array that achieves significantly increased resolution without necessitating either a corresponding increase in the number of pixels employed, or an increased spectral bandwidth of the subsequent output signal processing electronics used with the array.

In view of the above, the present invention provides an imaging device including a semiconductor substrate and a sampling grid in the form of a focal plane array of picture elements or pixels defined on the substrate and configured to permit measurement of minimum resolvable temperature differences beyond a theoretical boundary known as the Nyquist limit.

In carrying out the principles of the invention in accordance with one feature of an exemplary embodiment thereof, alternate horizontal rows of pixels are offset with respect to adjacent rows to provide a quincunx pattern resulting in improved resolution in azimuth by a significant factor over conventional orthogonal arrays. Theoretically, this improvement in resolution may be a factor of two over conventional two dimensionally rectilinear arrays having the same number of pixels.

In accordance with another feature of the exemplary embodiment, measurements of minimum resolvable temperature differences are made practical at sampling frequencies significantly exceeding the presently recognized Nyquist limit.

Thus, the present invention provides an imaging device for detecting radiant energy from a source object, the device including a semiconductor substrate; and a sampling grid of multiple like pixels formed on the substrate, the sampling grid having a physical arrangement of the pixels providing for extending measurement of a minimum resolvable temperature (MRT) difference of the radiant energy beyond the Nyquist theoretical limit.

According to a further aspect of the invention, the means of extending measurement of a minimum resolvable temperature difference beyond the theoretical Nyquist limit includes each pixel of the sampling grid of multiple like pixels having a certain width, the multiple pixels being arranged in a plurality of adjacent horizontal rows of plural pixels each having a certain pixel pitch dimension, each row of pixels being horizontally offset by a fractional part of the pixel pitch dimension with respect to each adjacent row of pixels.

The above ant additional features and advantages of the present imaging device will appear from a reading of the following description of a particular exemplary embodiment of the invention taken in conjunction with the following drawing figures.

BRIEF DESCRIPTION OF DRAWING FIGURES

DETAILED DESCRIPTION OF AN EXEMPLARY EMBODIMENT

Figure 1:
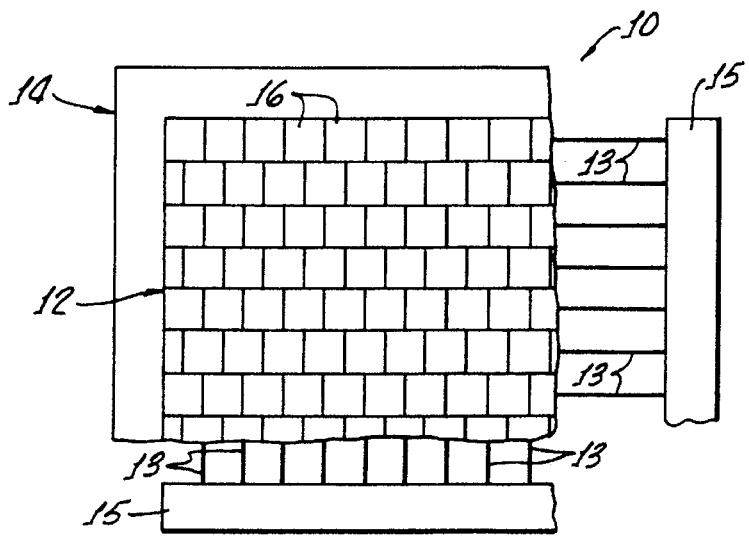
FIG. 1 is a partial plan view of an imaging device embodying the present invention.

Viewing FIG. 1, an imaging device 10 is illustrated fragmentarily. This imaging device includes a focal plane array (FPA) 12 formed on a substrate 14. The FPA 12 consists of adjacent horizontal rows of substantially identical picture elements or pixels commonly referenced with the numeral 16.

Each pixel comprises a radiant energy detector and associated circuitry for photovoltaically producing an electrical charge in response to the radiant energy incident on the receptive surface of the pixel 16. The rows and columns of pixels are connected by conductors 13 to multiplexer circuits 15. The conductors 13 are schematic and each represents one or more conductive traces extending across the substrate 14. The conductors 13 are used to interrogate particular pixels of the array 12 for their image information in a row-by-row, and pixel-by-pixel sequence preceding across rows of the array 12. The multiplexer circuits 15 are conventional, and are used to address each pixel and to receive the image information from the pixels in sequence for conversion to respective analogue output signals or to digital word output signals. While the detector and circuitry elements are known in the art, the unique arrangement of pixels 16 in the present array provides unexpectedly expanded performance capability and increased resolution for any particular number of pixels, as will be described below.

Figure 2:
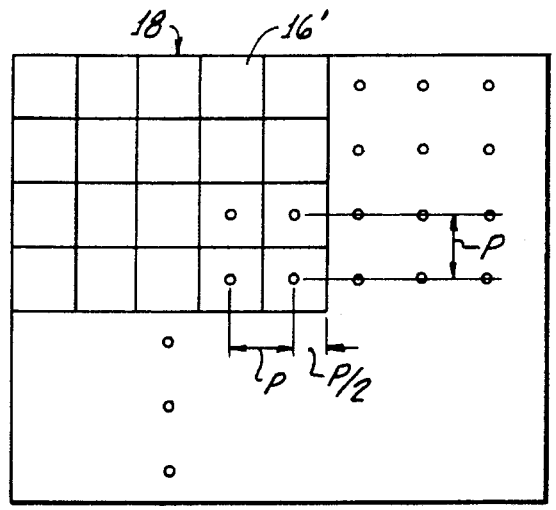
FIG. 2 is a partial plan view of a focal plane array in a known conventional imaging device illustrating an orthogonal arrangement of pixels.

In order to adequately portray the significant improvements provided by the present invention, it will be useful to discuss by way of contrast the arrangement and performance of a conventional FPA. FIG. 2 illustrates a representative portion of a typical orthogonally arranged focal plane array 18 grid of pixels 16' for sampling the energy radiating from a source object (not shown). For purposes of comparison only, the full orthogonal FPA 18 may include a rectangular array of 240 by 320 pixels 16', that is, 240 adjacent horizontal rows with 320 pixels 16' in each row. Vertically adjacent pixels are aligned in columns as illustrated. In both the vertical and horizontal directions, the pixels are arranged in straight rows. That is, the array seen in FIG. 2 is rectilinear in two dimensions.

The pixels 16' may be square in shape, capable of up to 100 percent fill factor, and located on a 15 micron horizontal and vertical pitch. Arrays are expected to have pixels of about 10 to 20 micron size with a like pitch dimension of substantially 10 to 20 microns, so that the pixels are immediately adjacent to one another without a spacing distance therebetween and give a 100 percent fill factor. The improvements of the present invention are equally applicable to future arrays having pixels of smaller sizes. Because of the extremely small dimensions involved, and for simplicity of illustration, the spacing between vertically and horizontally adjacent pixels is not shown. However, those ordinarily skilled in the pertinent arts will recognize that the pixels 16' may be conventionally spaced apart from one another. A conventional array 18 may consist, for example, of a 460 by 640 pixel grid, or of another size of orthogonal rectilinear (aligned columns) matrix with pixel dimensions as known to those Ordinarily skilled in the imaging field. The substrate max be, for example, a silicon CMOS or hi-polar CMOS readout integrated circuit substrate.

Viewing FIG. 2, the azimuthal (i.e., horizontal) center-to-center spacing between pixels 16' in a row is the pitch, referenced by the letter p. For the square pixels 16' discussed herein, the center to center spacing between vertically stacked pixels 16' in a column also has the same value, viz., "p" microns. As the orthogonal array 18 is sampled in either the horizontal (azimuthal) or vertical direction, the number of samples per traverse in either direction (i.e., across either a row or a column) is equal to the number of pixels 16' each "p" distance apart, in the respective rows and columns. Thus, for a 240 by 320 pixel orthogonal array, one azimuthal traverse results in a resolution as perceived by an observer based on 320 samples, each taken p microns apart.

Figure 3:
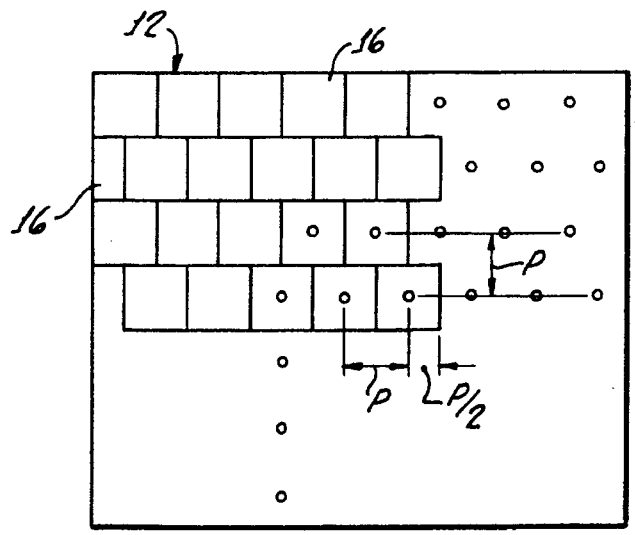
FIG. 3 is an enlarged partial plan view of the focal plane array seen in FIG. 1 illustrating a quincunx arrangement of pixels.

In contrast, the inventive array configuration illustrated in FIG. 3 has produced significant improvements in azimuthal resolution. Every row is offset horizontally by one-half a pitch length (p/2) with respect to the adjacent rows above and below, to produce a "brick wall" or quincunx pattern of pixels 16. As can readily be seen by comparing FIGS. 2 and 3, when two adjacent rows of the pixels in each array is considered, the number of discrete samples in an azimuthal traverse over an incremental horizontal distance (p+p/2) is twice the number for the new quincunx pattern of FIG. 3 as it is for the orthogonal rectilinear array of FIG. 2.

Thus, while vertical resolution remains the same in the quincunx array as in the orthogonal rectilinear array described earlier, azimuthal resolution is markedly increased in the quincunx arrangement without having to physically increase the number of pixels 16. Effectively, a 240 by 320 quincunx array has a theoretical resolution equivalent to that of a 240 by 640 conventional (orthogonal) array, providing appreciable savings and advantages in reduced use of time and materials, in higher manufacturing yield of acceptable arrays, and in reduced maintenance. Alternatively, the quincunx array according to the present invention may have adjacent rows of pixels offset one-third or one-fourth of the pitch dimension. Thus, these alternative arrays would have groups of three rows or of four rows, respectively, of pixels extending horizontally across the array. Within the groups, each row would be offset one-third or one fourth of the pitch dimension. Accordingly, "quincunx" as used herein, illustratively means a one half one third, one fourth or similar substantial fraction of the pixel dimension as the pixel offset for providing a brickwall type pattern.

Thus, it is seen that the horizontal rows of pixels of an array may be offset relative to one another a fractional part of the pitch dimension in order to improve the resolution of the array in the corresponding direction of test bar orientation. It will be appreciated that the quincunx array has lower resolution for a case in which the test bars have a forty-five degree diagonal orientation, since the Nyquist frequency is lower along this axis. However, because in the most frequently encountered circumstances objects are imaged with a preference for their vertical or horizontal features and orientation of the objects, the quincunx array will improve system performance.

Additionally, performance grading of a quincunx array imaging device is superior to that of a conventional orthogonal array. Performance is graded for either a quincunx or an orthogonal array by measuring the minimum resolvable temperature (MRT) difference on the pixel 16 or 16' surface at varying spatial sampling frequencies.

Figure 4:
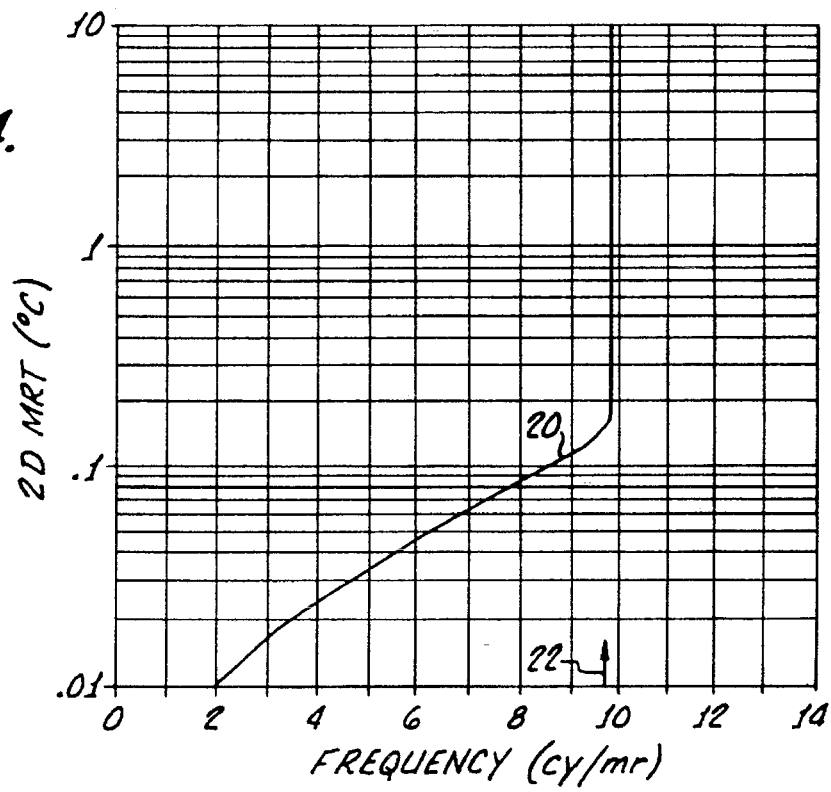
FIG. 4 is a graphical presentation of minimum resolvable temperature difference as a function of spatial frequency for the conventional array of FIG. 2.

FIG. 4 is a graphical representation of MRT in degrees Celsius versus spatial sampling frequency in cycles per milliradian (cy/mr) for a conventional orthogonal rectilinear array as seen in FIG. 2 having 480 by 640 pixels 16'. MRT curve 20 is plotted as spatial sampling frequency increases from two to nearly 10 cycles per milliradian. The traditional limitation on system performance, the Nyquist limit, is that frequency representing the reciprocal of the Nyquist interval, i.e., the maximum time interval between samples of the observed signal for adequate reproduction of the signal form. For the system of FIG. 4, the Nyquist limit is denoted by the arrow 22 on the abscissa at approximately 9.8 cycles per milliradian. The increase in MRT at the Nyquist limit for the array of FIG. 4 is seen to be sharp and to increase off the graph virtually as a step function. In other words, the MRT for the array becomes so large at the Nyquist limit of frequency that radiating objects cannot be distinguished from the background.

As predicted by the industry standard model of performance, called FLIR 92 from the Army Night Vision and Electro-Optics Directorate, FIG. 4 confirms that MRT measurements become indeterminable at the Nyquist limit for an orthogonal rectilinear arrangement. However, measurements well beyond the Nyquist limit, previously thought to be unavailable to an observer according to the FLIR 92 standard model, are achieved by the present invention.

Figure 5:
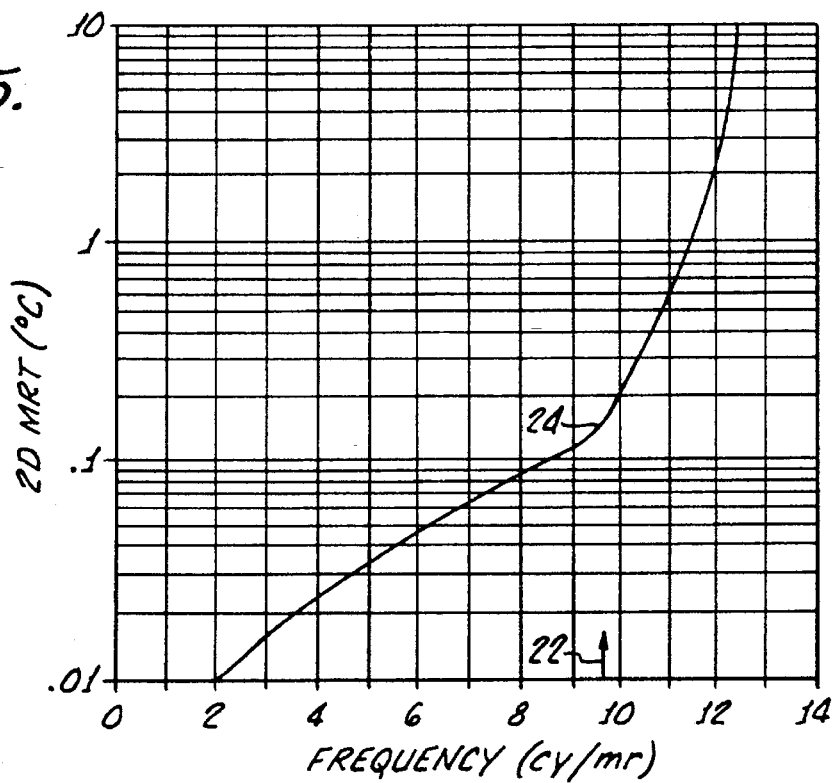
FIG. 5 is a graphical presentation of minimum resolvable temperature difference as a function of spatial frequency for the inventive array of FIG. 3.

FIG. 5 illustrates an expected MRT curve for a 480 by 640 pixel array arranged in the quincunx pattern illustrated in FIGS. 1 and 3. The performance curve of this quincunx array is referenced with the numeral 24. Even though the two arrays of FIGS. 4 and 5 have the same number of pixels, it is evident from these graphical comparisons that the quincunx focal plane array permits azimuthal measurements of minimum resolvable temperature difference to be made at frequencies considerably beyond the Nyquist limit frequency, which resents a practical upper limit of sampling frequency for the conventional orthogonal rectilinear focal plane array, but not for the quincunx array.

The azimuthal MRT improvement achieved by the quincunx FPA of the present invention in the illustrated case is on the order of 40 in frequency percent beyond that of the orthogonal rectilinear FPA, even though both the quincunx and the orthogonal arrays contain 640 pixels in each row. Pixel signal outputs from the quincunx array are sampled and subsequently processed as known in the art for conventional arrays to form images that are visible to an observer.

In view of the above, it is apparent that the present invention provides an imaging device which includes plural picture elements or pixels in an array. The device features a novel arrangement of pixels which results in azimuthal resolution that is significantly enhanced beyond that of known arrays, with no increase in the number of pixels employed.

Further, the present invention overcomes the limitations of a widely accepted industry standard model of performance which holds that no measurement of minimum resolvable temperature difference is practical above a Nyquist limit frequency. Advantageously, the present quincunx array allows minimum resolvable temperature differences to be measured at frequencies approximately 1.4 times as great as the previous limit recognized for conventional array of the same size.

While the present invention has been depicted, described and defined with reference to a particular exemplary embodiment thereof, such reference does not imply a limitation on the invention, and no such limitation is to be inferred. Accordingly, the invention is intended to be limited only by the spirit and scope of the appended claims, giving full cognizance to equivalents in all respects.

What is claimed is:

1. A staring imaging device for detecting radiant energy from a source object, said device comprising: a semiconductor substrate; and a sampling grid of multiple like pixels formed on said substrate, said grid having a quincunx arrangement providing means for extending measurement of a minimum resolvable temperature (MRT) difference of said radiant energy beyond the Nyquist theoretical limit.

2. The imaging device of claim 1 wherein said arrangement comprises each pixel of said sampling grid of multiple like pixels having a certain width, said multiple pixels being arranged in a plurality of adjacent horizontal rows of plural pixels each having a certain pixel pitch dimension, each row of pixels being horizontally offset by a fractional part of said pixel pitch dimension with respect to each adjacent row of pixels.

3. The imaging device of claim 2 wherein said fractional part of said pixel pitch dimension is substantially one-half of said pitch dimension.

4. The imaging device of claim 2 wherein each pixel comprises means for providing an electrical pixel output signal related to said radiant energy incident on said pixel.

5. The imaging device of claim 4 further including digitizing means for receiving said pixel output signal and providing a digital signal related to said pixel output signal.

6. The imaging device of claim 2 wherein said pixel width is in the range from substantially 50 microns to 20 microns.

7. The imaging device of claim 6 wherein said pixel pitch dimension is in the range from substantially 50 microns to 20 microns.

8. The imaging device of claim 7 wherein the number of said pixels in a typical one of said horizontal rows of said focal plane array is 320, and the number of said adjacent horizontal rows is 240.

9. A staring imaging device for thermal imaging of radiant energy from a source object, said device comprising a focal plane array including multiple like pixels each having a certain width, said multiple pixels being arranged in a plurality of adjacent horizontal rows each having a certain pixel pitch dimension, each row of pixels thereof being horizontally offset by a fractional part of said pixel pitch dimension with respect to each adjacent row of pixels to form a quincunx pattern, and wherein each pixel of said multiple pixels comprises means for providing an electrical pixel output signal related to the radiant energy incident on each said pixel.

10. A method of presenting an image of a source object which reflects or radiates radiant energy, said method comprising the steps of:

providing a staring array of like pixels each having a certain width and being arranged in a two dimensional array of adjacent horizontal rows having a certain pixel pitch dimension, each row thereof being horizontally offset by a fractional part of said pixel pitch dimension with respect to each adjacent row to form a quincunx array pattern;

causing radiation energy from said source object to impinge on said pixels in a pattern determined by the shape of said source object;

converting said radiant energy incident on each pixel of said array to an electrical output signal related to said incident radiant energy; and sampling said electrical pixel output signals at a spatial frequency rate.

11. The method of claim 10 further including the step of offsetting each row of pixels by one-half of said pixel pitch dimension.

12. The method of claim 10 further including the step of sampling said pixels at a frequency above the Nyquist limit frequency.

13. A staring device for receiving radiant energy from a source thereof and for converting said radiant energy into an output signal containing image information for said source, said device comprising:

a multitude of directional detector elements each of which in response to the receipt of radiant energy from said source provides a respective output signal;

a substrate carrying said multitude of detector elements arrayed in a two-dimensional and unidirectional array of plural adjacent rectilinear rows of detector elements, detector elements in each of said plural rows being spaced apart by a like pitch dimension, all of said detector elements being aligned parallel to a common directional axis for receiving said radiant energy, detector elements in each row of said plural rows of detector elements being offset along the length direction of said rows of detector elements a fractional part of said pitch dimension relative to detector elements in each adjacent row of detector elements;

whereby said array of detector elements is rectilinear only in the length direction of said plural rows of detector elements, but not in the direction perpendicular to the length direction of said rows wherein said offset is substantially one-half said pitch dimension, such that said array has a quincunx pattern.

14. A staring device for detecting radiant energy from a source comprising:

a staring focal plane array of adjacent, like pixel elements, said pixel elements arranged in a quincunx pattern.

15. The staring imaging device of claim 14 wherein the quincunx pattern is characterized by a pixel offset for having increased thermal resolution relative to an orthogonal rectilinear pixel arrangement.

16. The staring imaging device of claim 14 wherein the quincunx pattern is characterized by a pixel offset for increasing measurement of a minimum resolvable temperature difference of said radiant energy beyond the Nyquist theoretical limit.

17. The staring imaging device of claim 14 wherein the array is a full fill array.

18. An imaging device for detecting radiant energy from a source comprising:

a focal plane array of like pixel elements arranged in a quincunx pattern for increasing thermal resolution of said array, said quincunx pattern characterized by a pixel offset of N/X wherein n=a pixel dimension and x=2 or 3.

* * * * *